United States Patent
Cordeiro

(10) Patent No.: US 10,957,023 B2
(45) Date of Patent: Mar. 23, 2021

(54) VEHICULAR VISION SYSTEM WITH REDUCED WINDSHIELD BLACKOUT OPENING

(71) Applicant: Magna Electronics Inc., Auburn Hills, MI (US)

(72) Inventor: Alan M. Cordeiro, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/591,697

(22) Filed: Oct. 3, 2019

(65) Prior Publication Data
US 2020/0111196 A1 Apr. 9, 2020

Related U.S. Application Data

(60) Provisional application No. 62/741,563, filed on Oct. 5, 2018.

(51) Int. Cl.
| | |
|---|---|
| *B60R 11/04* | (2006.01) |
| *H04N 5/225* | (2006.01) |
| *G06T 5/00* | (2006.01) |
| *B60R 11/00* | (2006.01) |
| *B60R 1/00* | (2006.01) |

(52) U.S. Cl.
CPC ............. *G06T 5/006* (2013.01); *B60R 11/04* (2013.01); *B60R 1/00* (2013.01); *B60R 2011/0026* (2013.01); *B60R 2300/105* (2013.01); *B60R 2300/30* (2013.01); *B60R 2300/607* (2013.01); *G06T 2207/30252* (2013.01); *H04N 5/2253* (2013.01)

(58) Field of Classification Search
CPC .......... G06T 5/006; G06T 2207/30252; G06T 3/0093; G06T 3/00; B60R 11/04; B60R 2300/30; B60R 2300/607; B60R 2300/105; B60R 2011/0026; B60R 1/00; H04N 5/2253; H04N 5/2252; H04N 5/2628
See application file for complete search history.

(56) References Cited

U.S. PATENT DOCUMENTS

| | | |
|---|---|---|
| 5,096,287 A | 3/1992 | Kakinami et al. |
| 5,130,804 A | 7/1992 | Tamura |

(Continued)

*Primary Examiner* — Nhan T Tran
(74) *Attorney, Agent, or Firm* — Honigman LLP

(57) ABSTRACT

A vehicular vision system includes a camera disposed at an in-cabin surface of a vehicle windshield, which includes a blackout region and a light-transmitting window through the blackout region. The camera views through the windshield at the light-transmitting window. The field of view of the camera encompasses at least part of the blackout region around the light-transmitting window, such that some of the photosensing elements do not receive light that passes through the light-transmitting window. A control processes image data captured by the camera to provide a dewarped image and does not use some of the photosensing elements of the camera when providing the dewarped image. The light-transmitting window of the blackout region is sized and shaped such that the photosensing elements that are not used by the control in dewarping the image are the same photosensing elements that do not receive light that passes through the light-transmitting window.

14 Claims, 3 Drawing Sheets

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,796,094 A | 8/1998 | Schofield et al. |
| 5,877,897 A | 3/1999 | Schofield et al. |
| 5,920,061 A | 7/1999 | Feng |
| 5,949,331 A | 9/1999 | Schofield et al. |
| 6,501,387 B2 | 12/2002 | Skiver et al. |
| 6,690,268 B2 | 2/2004 | Schofield et al. |
| 6,824,281 B2 | 11/2004 | Schofield et al. |
| 7,038,577 B2 | 5/2006 | Pawlicki et al. |
| 7,095,572 B2 | 8/2006 | Lee et al. |
| 7,215,479 B1 | 5/2007 | Bakin |
| 7,289,037 B2 | 10/2007 | Uken et al. |
| 7,420,159 B2 | 9/2008 | Heslin et al. |
| 7,480,149 B2 | 1/2009 | DeWard et al. |
| 7,538,316 B2 | 5/2009 | Heslin et al. |
| 7,720,580 B2 | 5/2010 | Higgins-Luthman |
| 7,855,755 B2 | 12/2010 | Weller et al. |
| 8,223,203 B2 | 7/2012 | Ohsumi et al. |
| 8,256,821 B2 | 9/2012 | Lawlor et al. |
| 8,339,453 B2 | 12/2012 | Blake, III et al. |
| 8,531,278 B2 | 9/2013 | DeWard et al. |
| 8,542,451 B2 | 9/2013 | Lu et al. |
| 8,851,690 B2 | 10/2014 | Uken et al. |
| 9,090,213 B2 | 7/2015 | Lawlor et al. |
| 9,150,165 B1 | 10/2015 | Fortin et al. |
| 9,277,104 B2 | 3/2016 | Sesti et al. |
| 9,451,138 B2 | 9/2016 | Winden et al. |
| 9,487,159 B2 | 11/2016 | Achenbach |
| 9,596,387 B2 | 3/2017 | Achenbach et al. |
| 9,871,971 B2 | 1/2018 | Wang et al. |
| 2004/0189862 A1 | 9/2004 | Gustavsson et al. |
| 2005/0141106 A1 | 6/2005 | Lee et al. |
| 2006/0077575 A1 | 4/2006 | Nakai et al. |
| 2006/0103727 A1 | 5/2006 | Tseng |
| 2007/0171037 A1 | 7/2007 | Schofield et al. |
| 2008/0252882 A1 | 10/2008 | Kesterson |
| 2009/0295181 A1 | 12/2009 | Lawlor et al. |
| 2010/0172542 A1 | 7/2010 | Stein et al. |
| 2011/0025850 A1 | 2/2011 | Maekawa et al. |
| 2012/0008129 A1 | 1/2012 | Lu et al. |
| 2012/0013741 A1 | 1/2012 | Blake, III et al. |
| 2012/0081550 A1 | 4/2012 | Sewell |
| 2012/0105641 A1 | 5/2012 | Schofield et al. |
| 2012/0265416 A1 | 10/2012 | Lu et al. |
| 2012/0310519 A1 | 12/2012 | Lawlor et al. |
| 2013/0002873 A1 | 1/2013 | Hess |
| 2013/0037589 A1 | 2/2013 | Heslin et al. |
| 2013/0141579 A1 | 6/2013 | Schofield et al. |
| 2013/0144488 A1 | 6/2013 | Schofield et al. |
| 2013/0222593 A1* | 8/2013 | Byrne .................... G06T 3/005 348/148 |
| 2014/0043465 A1 | 2/2014 | Salomonsson et al. |
| 2014/0160284 A1 | 6/2014 | Achenbach et al. |
| 2014/0226012 A1 | 8/2014 | Achenbach |
| 2014/0241589 A1 | 8/2014 | Weber et al. |
| 2014/0320946 A1 | 10/2014 | Tomkins et al. |
| 2015/0015713 A1 | 1/2015 | Wang et al. |
| 2015/0327398 A1 | 11/2015 | Achenbach et al. |
| 2016/0264063 A1* | 9/2016 | Toma .................... B60R 11/04 |
| 2018/0330481 A1* | 11/2018 | Watanabe ............... G06T 5/006 |
| 2020/0112657 A1* | 4/2020 | Stein .................... H04N 7/181 |

* cited by examiner

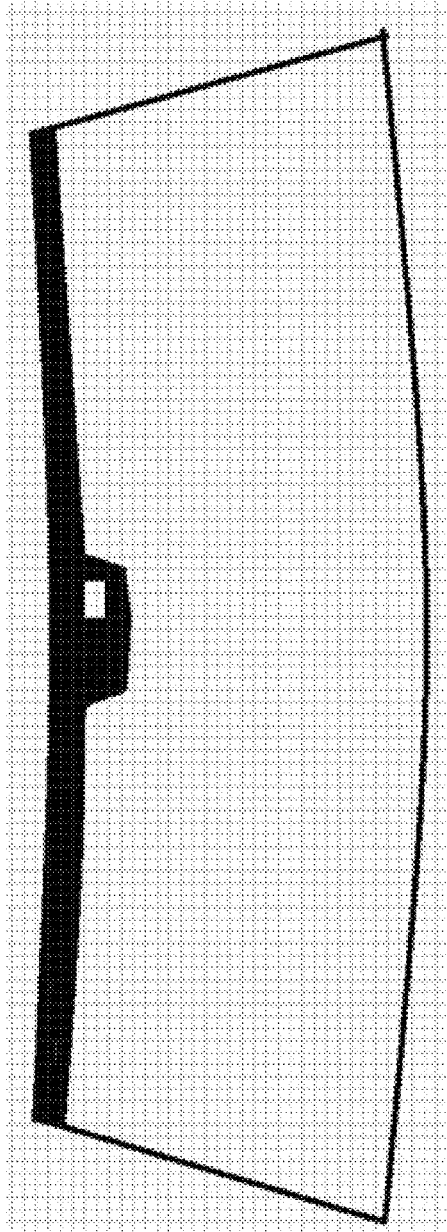
FIG. 4
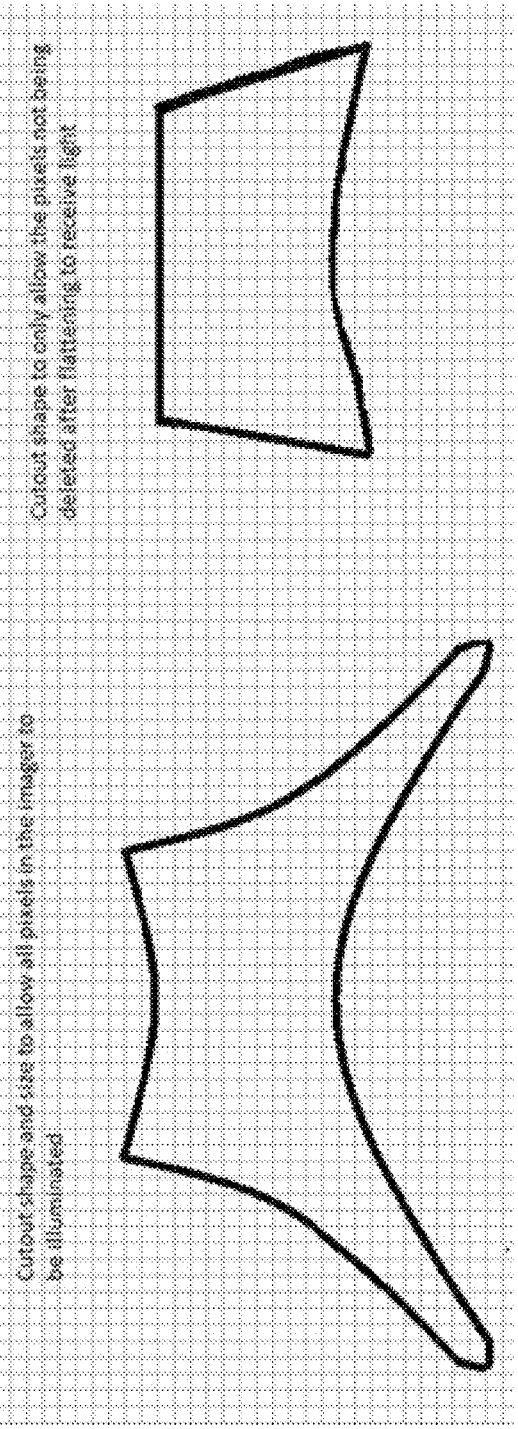
FIG. 6
FIG. 5

VEHICULAR VISION SYSTEM WITH REDUCED WINDSHIELD BLACKOUT OPENING

CROSS REFERENCE TO RELATED APPLICATION

The present application claims the filing benefits of U.S. provisional application Ser. No. 62/741,563, filed Oct. 5, 2018, which is hereby incorporated herein by reference in its entirety.

FIELD OF THE INVENTION

The present invention relates generally to a vehicular vision system and, more particularly, to a vehicular vision system that utilizes a forward viewing windshield-mounted camera.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes a windshield-mounted camera to capture image data representative of images exterior and forward of the vehicle. The windshield includes a blackout region and a light-transmitting window through the blackout region, and the camera views through the windshield at the light-transmitting window. The camera comprises a lens and an imager having a two dimensional array of photosensing elements. The field of view of the camera encompasses at least part of the blackout region around the light-transmitting window, such that some of the photosensing elements do not receive light that passes through the light-transmitting window. A control comprises a processor that processes image data captured by the camera to provide a dewarped image or reduced-distortion image. The control does not use some of the photosensing elements of the camera when generating or providing the dewarped image. The light-transmitting window of the blackout region is sized and shaped such that the some of the photosensing elements not used by the control are the same some of the photosensing elements that do not receive light that passes through the light-transmitting window.

Thus, the system and method of the present invention provides a reduced size and tailored shape of the light-transmitting window through the windshield blackout region, such that only the photosensing elements that are used in generating the dewarped image view through the light-transmitting window. The blackout region thus covers and hides more of the camera and windshield mounted module.

These and other objects, advantages, purposes and features of the present invention will become apparent upon review of the following specification in conjunction with the drawings.

BRIEF DESCRIPTION OF THE DRAWINGS

FIG. 4 is an image of a windshield showing the windshield blackout print or layer with a small light-transmitting window to allow the front camera to view through;

FIG. 5 is an image showing a light-transmitting window in the blackout print or layer that would result in all of the photosensing elements of the imager being used to sense light passing through the light-transmitting window; and FIG. 6 is an image showing the light-transmitting window in the blackout print or layer if only the photosensing elements of the imager used in generating the dewarped or flattened image are used to sense light passing through the light-transmitting window.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide output information regarding the objects and other information contained in the captured image data. Optionally, the vision system may provide output to a display, such as for displaying rearward images or top down or bird's eye or surround view images or the like.

Figure 1:
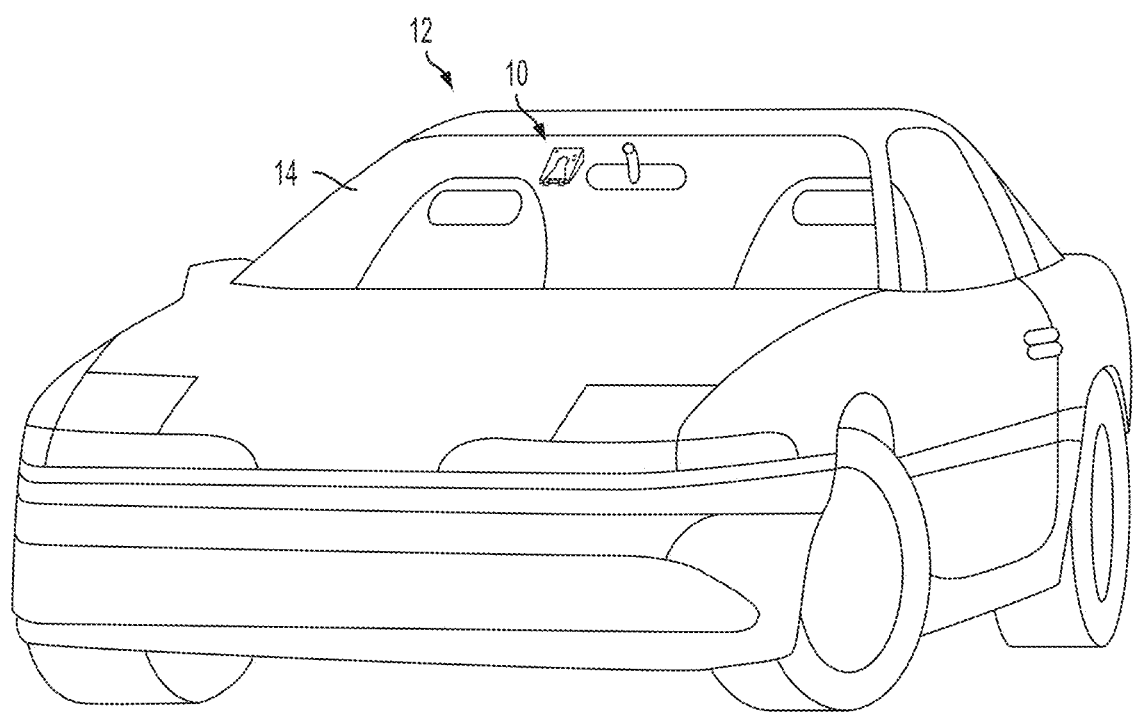
FIG. 1 is a perspective view of a vehicle with a vision system that incorporates a windshield mounted camera in accordance with the present invention.

Referring now to the drawings and the illustrative embodiments depicted therein, vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera is disposed at the windshield of the vehicle and views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

The forward viewing windshield-mounted camera is disposed at the in-cabin surface of the windshield and generally at and behind a blackout region of the windshield, where a ceramic frit layer or other suitable non-light-transmitting layer or coating is established at the windshield. The camera views through a blackout opening or light transmitting region of the blackout region. The present invention provides a strategy or process to reduce the size of the front windshield blackout opening for intelligent front camera vehicle applications by understanding which pixels will end up being discarded internally.

The forward looking camera is installed in the upper center of a vehicle windshield. From this vantage point, the camera captures image data representative of the view through the windshield and in front of the vehicle. The image data captured by the camera is then processed by intelligent algorithms for object detection, such as for detecting vehicles, pedestrians, road markings, traffic signs and other such information of interest ahead of the vehicle and/or in the field of view of the camera. Some camera systems have a very wide field of view (utilizing a wide angle lens or fisheye lens), and the image data captured by such a camera is distorted by the properties of the wide angle lens (where the distorted image from a wide angle lens typically has greater distortion at the boundaries of the image and less distortion at the center of the image, such as can be seen with reference to FIG. 2). This distortion effect is commonly known as the fish-eye lens effect.

Figure 2:
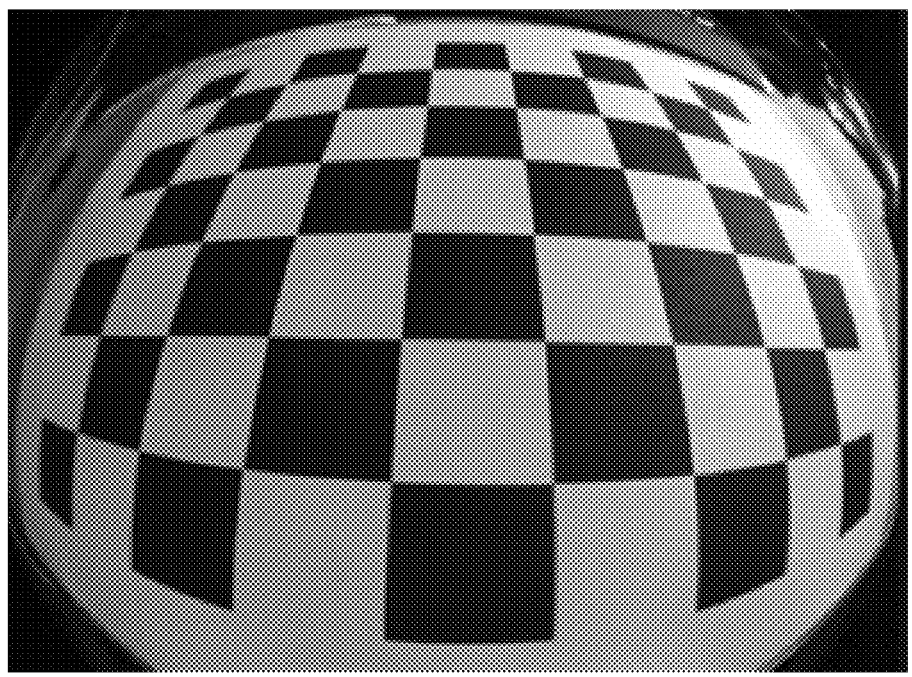
FIG. 2 is an image derived from image data captured by a camera before flattening or dewarping.
Figure 3:
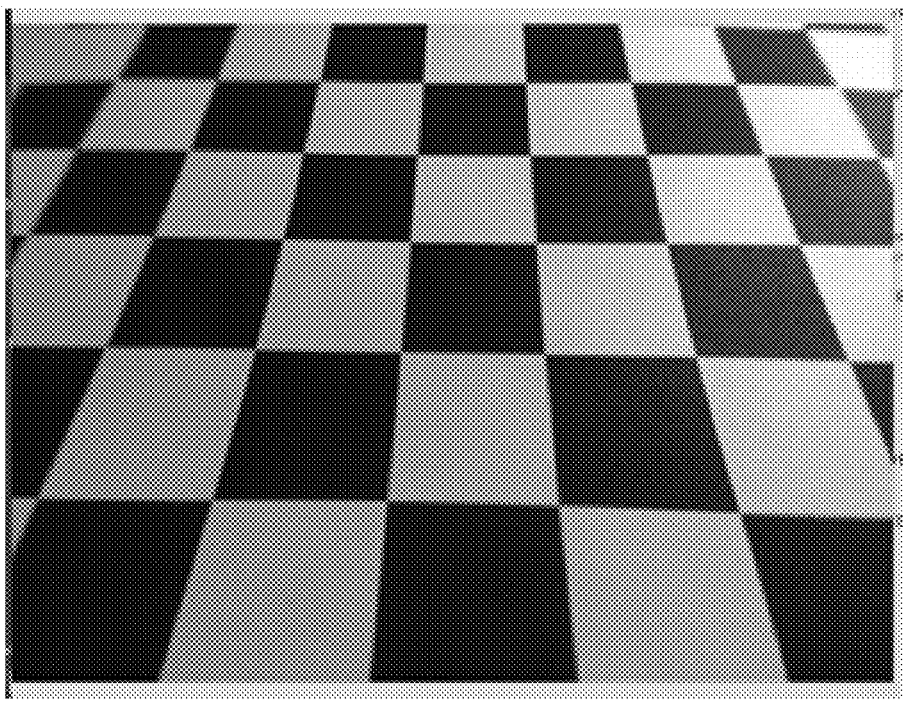
FIG. 3 is an image derived from image data captured by the camera after flattening or dewarping.

For the intelligent recognition algorithms to function correctly, the distorted image data that is received needs to be corrected, and this process is known as "flattening" or "dewarping." Examples of images derived from or resulting from captured image data are shown in FIGS. 2 and 3, with FIG. 2 showing the raw, distorted image (derived from the raw image data captured by the camera), and with FIG. 3 showing the reduced-distortion image after correction or dewarping. In the "after" image (FIG. 3), it can be seen that, in the process of correcting the image, some of the pixel information in the corners of the original image are lost (discarded) by the transformation.

When designing vehicles, the vehicle manufacturer will usually try their best to hide all functional modules as far as they can. As part of this process, a blackout band is created on the top section of the windshield to hide all the operational modules installed in the vehicle in the space directly behind the top section of the windshield. This area is usually available because blocking the upper part of the windshield does not affect the driver's view out the front of the vehicle.

Opaque blackout at the windshield presents a problem for the front camera, since it must be able to view through the windshield, so a special cutout or light-transmitting aperture or window is made in the black print to provide the forward camera a clear view through the windshield and forward of the vehicle.

FIG. 4 shows how the windshield blackout print looks on a typical windshield, along with a small rectangle showing where the opening is typically made to allow the front camera to view through the opening and through the windshield. With reference to FIG. 5, a representation shows how the cutout might look if none of the light rays falling on the imager are permitted to be blocked by the opaque coating (i.e., if all of the photosensing elements or pixels of the camera receive light passing through the light-transmitting window of the blackout region). In contrast, and with reference to FIG. 6, the representation shows how much smaller the cutout could be made if un-needed pixels, those that would be discarded in the flattening or dewarping process, are blocked out by the opaque section of the windshield black print.

Thus, FIG. 5 shows how the opening in the black print would look if the light rays in the field of view in front of the imager would be required to illuminate all the pixels on the imager. In contrast, FIG. 6 shows how the opening in the black print could be made smaller if only the pixels remaining after flattening needed to be illuminated. Pixels which would be discarded anyway can be blocked out (i.e., be disposed behind the blackout region so as to not receive light passing through the light-transmitting window of the blackout region). As can be seen by comparing FIGS. 5 and 6, the corners of the opening of FIG. 5 are blacked out in the smaller opening of FIG. 6.

Thus, the present invention provides a tailored cutout size and shape for the light-transmitting window of the blackout region at the forward viewing windshield-mounted camera. The size and shape of the light-transmitting window are selected based on the pixels of the camera that are actually used in generating the dewarped or reduced-distortion image derived from image data captured by the camera. In other words, the pixels or photosensors of the photosensor array of the imager that capture or sense light representative of the parts (e.g., the corners) of the captured image that are lost when dewarping the warped or raw captured image are blocked by or behind the blackout region, such that only the pixels or photosensors of the photosensor array of the imager that capture or sense light representative of the parts (see FIG. 6) of the captured image that are used in the dewarped image view through the light-transmitting window (with the other pixels not viewing through the light-transmitting window and being blocked by the tailored blackout region).

The size and shape of the light-transmitting window of the blackout region may be adjusted or altered or selected depending at least in part on the lens of the camera (e.g., its wide angle range and degree of distortion in the resultant captured images) and/or the mounting orientation and location of the camera and distance of the camera from the in-cabin surface of the windshield. The size and shape of the light-transmitting window of the blackout region may also or otherwise be adjusted or altered or selected based at least on part on the tilt angle of the windshield and the curvature of the windshield, at least at the region in front of the camera. The size and shape of the light-transmitting window thus may be designed for each particular vehicular application of a windshield-mounted forward viewing camera. The resulting shape of the light-transmitting window has non-linear boundaries, such as curved upper, side and lower boundaries, in order to blackout the non-used pixels. As an additional benefit of reducing the extraneous amount of light falling on the imager (by tailoring the shape and reducing the size of the light-transmitting window), the reduced size light-transmitting window results in a reduction in the background noise from internal reflections (called the flare effect) inside the camera system.

The vision system and camera and non-light-transmitting blackout region at the windshield may utilize aspects of the systems described in U.S. Pat. Nos. 8,531,278; 9,090,213; 9,451,138; 9,487,159 and/or 9,871,971, and/or U.S. Publication No. US-2016-0264063, which are hereby incorporated herein by reference in their entireties. The forward viewing camera may be disposed at a windshield electronics module (WEM) or the like. The system and module and forward viewing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-

0226012 and/or US-2009-0295181, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, said vehicular vision system comprising:

a camera disposed at an in-cabin surface of a windshield of a vehicle and having a field of view through the windshield and forward of the vehicle;

wherein the windshield includes a blackout region, the blackout region having a light-transmitting window therethrough;

wherein the camera views through the windshield at the light-transmitting window;

wherein the camera comprises a lens and an imager having a two dimensional array of photosensing elements;

wherein the field of view of the camera encompasses the light-transmitting window and at least part of the blackout region;

wherein a subset of photosensing elements of the two dimensional array of photosensing elements receives light that passes through the light-transmitting window;

wherein the subset of photosensing elements of the camera that receives light that passes through the light-transmitting window is less than all of the photosensing elements of the two dimensional array of photosensing elements of the camera;

wherein others of the photosensing elements of the two dimensional array of photosensing elements that are not part of the subset of photosensing elements do not receive light that passes through the light-transmitting window;

a control comprising a processor that processes image data captured by the camera;

wherein image data captured by the camera is provided to the control and processed by the processor to provide a dewarped image;

wherein image data captured by the camera that is processed by the processor to provide the dewarped image comprises image data captured by the subset of photosensing elements;

wherein the light-transmitting window of the blackout region is sized and shaped such that the others of the photosensing elements that do not receive light that passes through the light-transmitting window are not used by the processor when processing captured image data and providing the dewarped image; and wherein a lower boundary of the light-transmitting window of the blackout region comprises a non-linear lower boundary that is curved upward at a central region of the lower boundary.

2. The vehicular vision system of claim 1, wherein the lens comprises a wide angle lens.

3. The vehicular vision system of claim 1, wherein the others of the photosensing elements that do not receive light that passes through the light-transmitting window are at least at corners of the two dimensional array of photosensing elements.

4. The vehicular vision system of claim 1, wherein opposite side boundaries of the light-transmitting window of the blackout region comprise non-linear side boundaries.

5. The vehicular vision system of claim 1, wherein an upper boundary of the light-transmitting window of the blackout region comprises a non-linear upper boundary.

6. A method of determining a light-transmitting window of a blackout region of a vehicle windshield, said method comprising:

providing a camera comprising a lens and an imager having a two dimensional array of photosensing elements;

providing a control having a processor that processes image data captured by the camera;

processing, at the control, image data captured by the camera to generate a dewarped image;

determining (i) a subset of photosensing elements of the two dimensional array of photosensing elements that are used in generating the dewarped image and (ii) others of the photosensing elements of the two dimensional array of photosensing elements that are not used in generating the dewarped image;

determining a size and shape of a light-transmitting window of a blackout region of a vehicle windshield whereby, when the camera is disposed behind the vehicle windshield so as to view through the light-transmitting window, the determined others of the photosensing elements that are not used in generating the dewarped image are disposed behind the blackout region of the vehicle windshield and do not view through the light-transmitting window;

wherein determining the size and shape of the light-transmitting window of the blackout region of the vehicle windshield comprises determining at least one non-linear boundary of the light-transmitting window of the blackout region of the vehicle windshield; and wherein determining at least one non-linear boundary comprises determining a non-linear lower boundary of the light-transmitting window of the blackout region of the vehicle windshield that is curved upward at a central region of the lower boundary.

7. The method of claim 6, wherein the lens comprises a wide angle lens.

8. The method of claim 6, wherein, when the camera is disposed behind the vehicle windshield so as to view through the light-transmitting window, the determined subset of photosensing elements that are used in generating the dewarped image view through the light-transmitting window of the vehicle windshield.

9. The method of claim 6, wherein the determined others of the photosensing elements that are not used in generating the dewarped image are at least at corners of the two dimensional array of photosensing elements.

10. The method of claim 6, wherein determining non-linear boundaries comprises determining non-linear opposite side boundaries of the light-transmitting window of the blackout region of the vehicle windshield.

11. The method of claim 6, wherein determining non-linear boundaries comprises determining a non-linear upper boundary of the light-transmitting window of the blackout region of the vehicle windshield.

12. A vehicular vision system, said vehicular vision system comprising:

a camera disposed at an in-cabin surface of a windshield of a vehicle and having a field of view through the windshield and forward of the vehicle;

wherein the windshield includes a blackout region, the blackout region having a light-transmitting window therethrough;

wherein the camera views through the windshield at the light-transmitting window;

wherein the camera comprises a lens and an imager having a two dimensional array of photosensing elements;

wherein the lens comprises a wide angle lens;

wherein the field of view of the camera encompasses the light-transmitting window and at least part of the blackout region;

wherein a subset of photosensing elements of the two dimensional array of photosensing elements receives light that passes through the light-transmitting window;

wherein the subset of photosensing elements of the camera that receives light that passes through the light-transmitting window is less than all of the photosensing elements of the two dimensional array of photosensing elements of the camera;

wherein others of the photosensing elements of the two dimensional array of photosensing elements that are not part of the subset of photosensing elements do not receive light that passes through the light-transmitting window;

a control comprising a processor that processes image data captured by the camera, and wherein the captured image data is representative of a distorted image;

wherein image data captured by the camera is provided to the control and processed by the processor to provide a reduced-distortion image;

wherein image data captured by the camera that is processed by the processor to provide the reduced-distortion image comprises image data captured by the subset of photosensing elements;

wherein the others of the photosensing elements that do not receive light that passes through the light-transmitting window are not used by the processor when processing captured image data and providing the reduced-distortion image; and wherein a lower boundary of the light-transmitting window of the blackout region comprises a non-linear lower boundary that is curved upward at a central region of the lower boundary.

13. The vehicular vision system of claim 12, wherein the others of the photosensing elements that do not receive light that passes through the light-transmitting window are at least at corners of the two dimensional array of photosensing elements.

14. The vehicular vision system of claim 12, wherein an upper boundary of the light-transmitting window of the blackout region comprises a non-linear upper boundary.

* * * * *